(12) United States Patent
Caro

(10) Patent No.: US 7,794,526 B2
(45) Date of Patent: Sep. 14, 2010

(54) ADVANCED METHANE AND AMMONIA RECOVERY SYSTEM

(76) Inventor: Sal Caro, 7046 Quito Ct., Camarillo, CA (US) 93012

( * ) Notice: Subject to any disclaimer, the term of this patent is extended or adjusted under 35 U.S.C. 154(b) by 0 days.

(21) Appl. No.: 12/356,792

(22) Filed: Jan. 21, 2009

(65) Prior Publication Data
US 2009/0126563 A1      May 21, 2009

Related U.S. Application Data

(63) Continuation-in-part of application No. 11/754,057, filed on May 25, 2007.

(51) Int. Cl.
*B01D 53/22* (2006.01)

(52) U.S. Cl. .............. 96/4; 52/90.2; 119/416; 119/436; 119/482; 174/2; 174/3

(58) Field of Classification Search ........ 96/4; 52/90.2; 119/416, 436, 482; 174/2, 3
See application file for complete search history.

(56) References Cited

U.S. PATENT DOCUMENTS

| | | | | |
|---|---|---|---|---|
| 2,234,205 | A * | 3/1941 | Steele, Jr. | 174/2 |
| 4,169,712 | A * | 10/1979 | Boyce et al. | 48/197 A |
| 4,209,303 | A * | 6/1980 | Ricks | 48/111 |
| 6,167,896 | B1 * | 1/2001 | Smith | 135/96 |
| 6,393,821 | B1 * | 5/2002 | Prabhu | 60/781 |
| 6,810,832 | B2 * | 11/2004 | Ford | 119/437 |
| 2002/0070152 | A1 * | 6/2002 | Charbonneau | 210/170 |
| 2002/0162671 | A1 * | 11/2002 | Darveniza | 174/3 |

FOREIGN PATENT DOCUMENTS

| DE | 102008004983 A1 * | 7/2009 |
|---|---|---|
| JP | 2005098817 A * | 4/2005 |

OTHER PUBLICATIONS

R.L. "Bovine Burpalyzer" Oct. 1994 Popular Science, p. 24.*
Moran "Cooks with Bio-Gas" Dec. 1975 Popular Science, pp. 95, and 109.*
Lindsley "Methane from waste . . . How much power can it supply?" Dec. 1974 Popular Science, pp. 58-60 and 128.*
Lindsley (Byron McDonald: Cowpower helps run his farm) May 1975 Popular Science pp. 106-107.*

* cited by examiner

*Primary Examiner*—Jason M Greene
*Assistant Examiner*—Anthony Shumate
(74) *Attorney, Agent, or Firm*—Kenneth L. Green

(57) ABSTRACT

An advanced methane and ammonia recovery system captures gaseous waste produced by domestic livestock to reduce the release of greenhouse gasses into the atmosphere and to generate energy. The system includes a gas capture system residing at a peak of a barn. At large commercial operations, the captured gasses pass through a separator to separate methane from ammonia gas. The ammonia is processed to obtain a fertilizer. The methane is stored in a tank, and drawn from the tank to provide fuel for an electrical generator. At smaller operations, the captured gasses may be stored in a tank for periodic collection by a tanker truck or other transportation, or where economically feasible, piped to a central processing location. The system is designed to substantially reduce the amount of methane gas released into the environment while providing additional income to the domestic livestock operations.

15 Claims, 3 Drawing Sheets

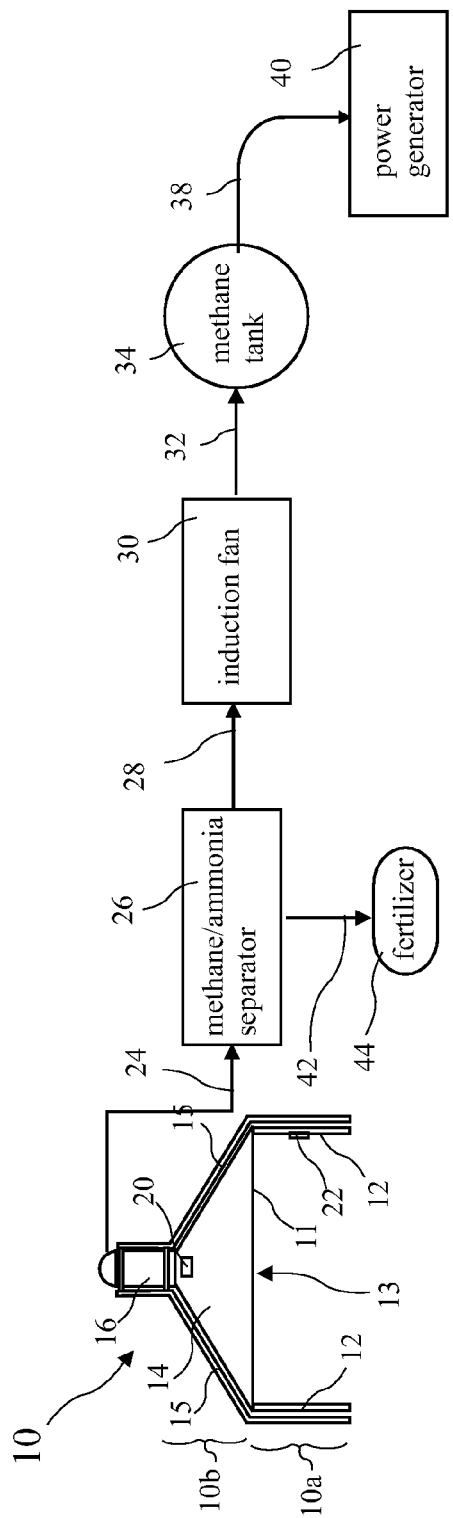
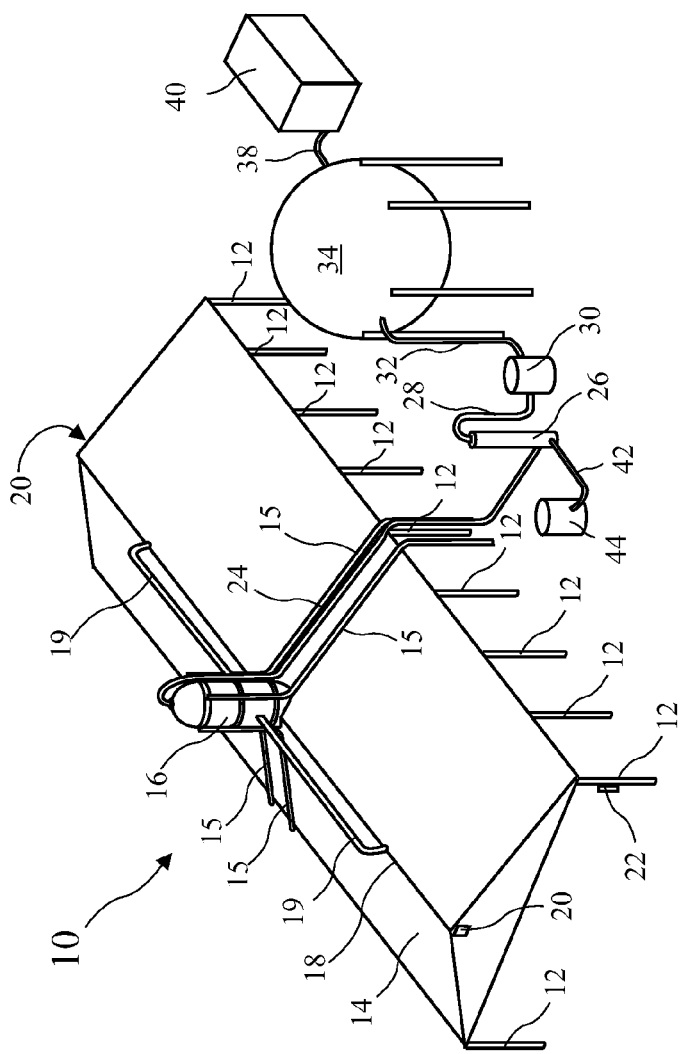
FIG. 1
FIG. 2

ADVANCED METHANE AND AMMONIA RECOVERY SYSTEM

The present application is a Continuation In Part of U.S. patent application Ser. No. 11/754,057 filed May 25, 2007, which application is incorporated in its entirety herein by reference.

BACKGROUND OF THE INVENTION

The present invention relates to processing treatment of waste from domestic livestock and poultry operations and in particular to an integrated system for efficiently capturing and processing waste material from domestic livestock and poultry operations including methane gas which has been estimated to makeup about one fifth of recognized green house gas effects.

Domestic livestock and poultry operations in the United States produce a substantial portion of the food regularly consumed by the pubic. Unfortunately, these operations also produce significant waste which must be dealt with, and significant odors not appreciated by local residents. Until the present time, no large scale systems have been developed to deal efficiently with these waste products.

Further, both sheep and cows are ruminant animals. Ruminant animals include a rumen, a special stomach which allows them to digest plants not normally digestible. Enteric fermentation takes place in the rumen producing methane gas. The methane gas is later released to the atmosphere. Methane gas traps much more heat than carbon dioxide and may linger in the atmosphere over a decade. Scientists have estimated that methane gas is responsible for one fifth of greenhouse warming. Unfortunately, no effective solution has been provided to capture the methane gas released by cows, sheep and other ruminant animals.

BRIEF SUMMARY OF THE INVENTION

The present invention addresses the above and other needs by providing an advanced methane and ammonia recovery system which captures gaseous waste produced by domestic livestock to reduce the release of greenhouse gasses into the atmosphere and to generate energy. The system includes a gas capture system residing at a peak of a barn. At large commercial operations, the captured gasses pass through a separator to separate methane from ammonia gas. The ammonia is processed to obtain a fertilizer. The methane is stored in a tank, and drawn from the tank to provide fuel for an electrical generator. At smaller operations, the captured gasses may be stored in a tank for periodic collection by a tanker truck or other transportation, or where economically feasible, piped to a central processing location. The system is designed to substantially reduce the amount of methane gas released into the environment while providing additional income to the domestic livestock operations.

In accordance with one aspect of the invention, there is provided a gas recovery system including a barn, a gas capture vessel, an ammonia/methane separator, a membrane unit, and a methane storage tank. The gas capture vessel has a height between approximately 20 feet and approximately 25 feet and a diameter between approximately eight feet and approximately ten feet, and resides at a peak of the barn for collecting gaseous waste. A first methane sensor resides inside the gas capture vessel between approximately two feet and approximately four feet below a top of the gas capture vessel and a second methane sensor resides inside the gas capture vessel vertically between approximately 2.5 feet and approximately four feet above a bottom of the gas capture vessel. A first duct fluidly connects the gas capture vessel to the ammonia/methane separator and a second duct fluidly connects the ammonia/methane separator and the membrane unit. A fan resides in the flow between the ammonia/methane separator and the membrane unit and controlled by the first methane sensor and the second methane sensor. A third duct fluidly connects the membrane unit to the methane storage tank for carrying methane from the membrane unit to the methane storage tank. The membrane unit separates methane gas from other gasses and the methane gas stored in the methane storage tank may be used to power a generator.

In accordance with another aspect of the invention, there is provided a gas recovery system including a barn, a gas capture vessel residing at a peak of the upper tent portion for collecting gaseous waste, external beams residing outside the barn and supporting the gas capture vessel independently of the barn, and a gas storage tank. The barn includes a lower post portion comprising vertical posts and open between the posts and an upper tent portion forming an upward concave cavity. A duct is connected to the gas capture vessel for carrying the gaseous waste from the gas capture vessel toward the gas storage tank, a fan moves the gaseous waste from the capture vessel toward the gas storage tank, and a gas sensor is positioned to detect the presence of the gaseous waste in the peak of the tent portion, the capture vessel, or the duct.

In accordance with yet another aspect of the invention, there is provided a method for controlling a gas recovery system. The method includes the steps of initially turning to OFF a fan used to draw gaseous waste from a gas capture vessel through the gas recovery system. The system then enters a loop and tests if the fan is ON or OFF. If the fan is ON and if a first gas sensor residing inside the gas capture vessel proximal to a top of the gas capture vessel is sensing the presence of the gaseous waste, the fan remains ON. If the fan is ON and if the first gas sensor is not detecting the presence of the gaseous waste, the fan is turned OFF. If the fan is OFF, it is left OFF if either or both the first gas sensor is not sensing the presence of the gaseous waste and a second gas sensor residing inside the gas capture vessel proximal to a bottom of the gas capture vessel is not sensing the presence of the gaseous waste. If the fan is OFF, it is turned ON if both gas sensors are detecting the presence of the gaseous waste.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a block diagram of a methane and ammonia recovery system according to the present invention.

FIG. 2 depicts a barn with a gas capture vessel residing at a peak, and gas processing equipment.

Corresponding reference characters indicate corresponding components throughout the several views of the drawings.

DETAILED DESCRIPTION OF THE INVENTION

Figure 3:
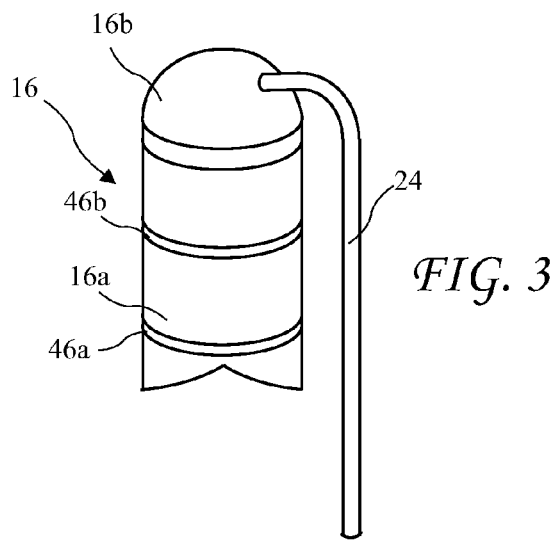
FIG. 3 shows a perspective view of the gas capture vessel.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

An advanced methane and ammonia recovery system according to the present invention is shown functionally in FIG. 1 and geometrically in FIG. 2. Livestock residing in a barn, house, and/or enclosure 10 produces gaseous waste. The barn 10 comprises a base (or post) portion 10a and a tent portion 10b covered by a covering 14. The post portion comprises a multiplicity of vertical posts 12 supporting the tent portion 10b. The tent portion 10b includes an approximately horizontal closed bottom edge 11 and forms an upward concave cavity 13 and may be any solid surface which traps waste gas rising from beneath. A gas capture vessel 16 resides at a peak 18 of the tent portion 10b. The gas capture vessel 16 is preferably centered along the peak 18 and two collecting ducts 19 run from the gas capture vessel 16 in opposite directions above the peak 18 approximately ⅔ of the distance from the gas capture vessel 16 to ends of the tent portion 10b.

The gaseous waste is lighter than air and rises into the gas capture vessel 16 where the gaseous waste is captured. The gaseous waste is collected in the gas capture vessel 16 and carried by first duct 24 to an ammonia/methane separator 26 (for example, an ammonia scrubber). The ammonia/methane separator 26 separates ammonia from other gasses (primarily methane) in the gaseous waste. The ammonia, which is converted into ammonium sulfate, is carried by ammonia duct 42 to an ammonium sulfate storage tank 44 for further drying into fertilizer.

The other gasses are carried by second duct 28 to a membrane unit 30 where the methane is separated from oxygen and nitrogen. The separation is preferably done by selectively permeable membrane(s). The membrane unit 30 preferably includes a fan to draw the gaseous waste from the gas capture vessel 16, through the ammonia/methane separator 26, and to the membrane unit 30. Methane captured by the membrane unit 26 is carried by a third duct 32 to a methane storage tank 34. The methane stored in the methane storage tank 34 is provided through a fourth duct 38 to a generator 40 where the methane is used as fuel to generate electricity.

The gas capture vessel 16 is structurally supported by beams 15. Preferably four beams are attached to the gas capture vessel 16 and reside outside the barn 10 presenting no load to the barn 10. The four beams 15 are preferably steel "I" beams but may also be trusses.

Ventilation assemblies 20 are attached to the barn 10 to provide ventilation if measure methane levels exceed a threshold to prevent waste gas from building up in the breathable airspace of the ruminant animals and humans. The ventilation assemblies 20 preferably reside at opposite ends of the barn 10 proximal to the height of the peak 18 and are preferably automatically controlled and comprise vent doors which are opened to vent excess waste gasses. Manual and automatic monitoring and switch unit 22 reside on one of the posts 12 allowing an operator to monitor conditions in the barn 10 and to shut off the components of the advanced methane and ammonia recovery system should unsafe conditions arise. The monitoring may include temperature, levels of one or more gasses in the tent portion 10b.

Figure 4:
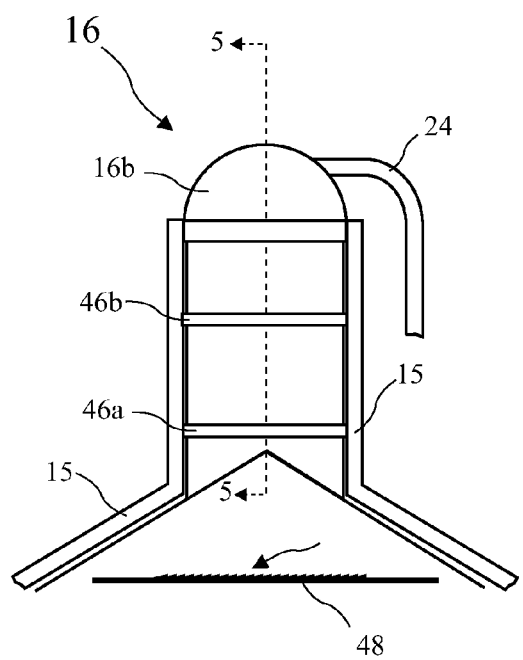
FIG. 4 shows a side view of the gas capture vessel.
Figure 5:
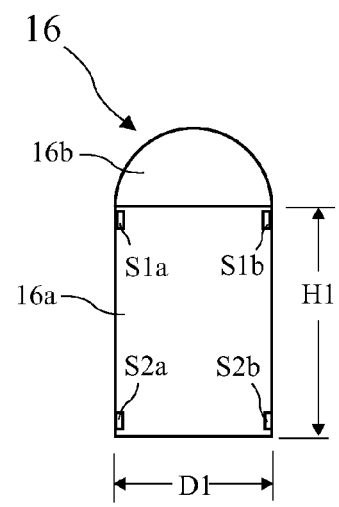
FIG. 5 is a cross-sectional view of the gas capture vessel taken along line 5-5 of FIG. 4.

A perspective view of the gas capture vessel 16 is shown in FIG. 3, a side view of the gas capture vessel 16 is shown in FIG. 4, and a cross-sectional view of the gas capture vessel 16 taken along line 5-5 of FIG. 4 is shown in FIG. 5. The gas capture vessel 16 comprises a vertical cylindrical body 16a and a cap 16b. The cap 16b may be hemispherical, conical, or other shape with a peak, and is preferably hemispherical. A cylindrical body 16a of the capture vessel 16 is preferably made from fiberglass, and a cap 16b of the capture vessel 16 is preferably made from steel. The cap 16b protects the capture vessel 16 and is grounded to serve as a lighting rod. The first duct 24 connects to the cap 16b to draw the gaseous waste from the capture vessel 16.

A lower band 46a near the base of the cylindrical body 16a and a center band 46b approximately vertically centered on the cylindrical body 16a along with the cap 16b are attached to the beams 15 and to the cylindrical body 16a to support the capture vessel 16, and the beams 15 also ground the cap 16b. An air turbulence reduction shield 48 resides below the capture vessel 16. The air turbulence reduction shield 48 comprises a horizontally residing sheet centered under the peak 18 and preferably under the ventilation assemblies 20 and extending approximately the length of the capture vessel. The shield 48 is preferably square with sides having a length the same as the diameter of the capture vessel 16. The air turbulence reduction shield 48 resides approximately four feet under the peak 18 and leave horizontal gaps of approximately twelve inches between edges of the air turbulence reduction shield 48 and the inner surface of the tent portion 16b. The shield 48 is preferably made of fiberglass and includes a number of openings 48a, and is similar to a grating to allow gases to pass through the shield 48, but protects ruminant animals and humans below from any explosion.

The cylindrical body 16a has a height H1 which is preferably between approximately 20 feet and approximately 25 feet tall and a diameter D1 which is preferably between approximately eight feet and approximately ten feet, but may vary outside this range depending on the number of animals in the barn. Gas sensors S1a, S1b, S2a, and S2b reside inside the cylindrical body 16a. The pair of upper gas sensors S1a and S1b resides proximal to the top of the cylindrical body 16a and the pair of lower gas sensor S2a and S2b resides proximal to the base of the cylindrical body 16a. The gas sensors are preferably methane sensors, but may sense any gas present in the gaseous waste in sufficient quantities to allow reliable sensing of the presence of the gaseous waste in the gas capture vessel 16.

Figure 6:
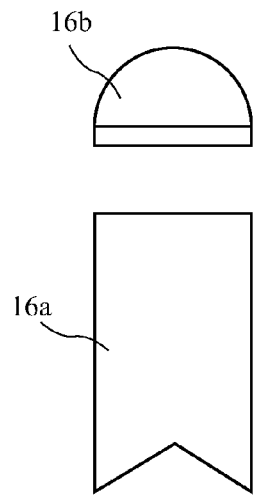
FIG. 6 shows a cap and body of the gas capture vessel.

The cap 16b is shown separated from the cylindrical body 16a in FIG. 6.

Figure 7:
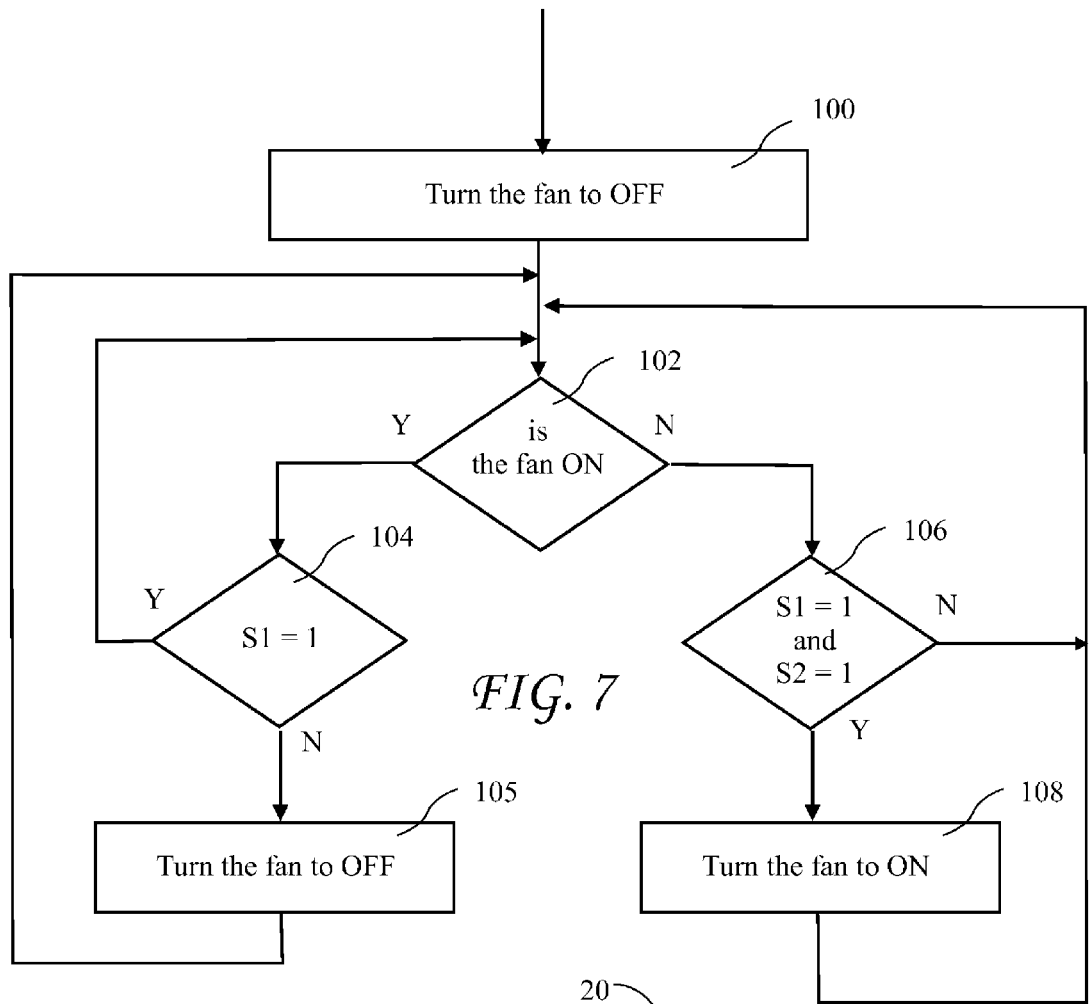
FIG. 7 is a method according to the present invention.

A method for controlling an operation of the gas recovery system is described in FIG. 7. The fan is initially turned to OFF at step 100 and a control loop is entered. If the fan is ON at step 102, and if the first gas sensor S1 is detecting (i.e., S1=1) the presence of the gaseous waste, the fan remains ON. If the fan is ON at step 102, and if the first gas sensor S1 is not detecting (i.e., S1=0) the presence of the gaseous waste at step 104, the fan is turned OFF at step 105. If the fan is OFF at step 102, and if both the first sensor S1 is detecting (i.e., S1=1) the presence of the gaseous waste and the second sensor S2 is detecting (i.e., S2=1) the presence of the gaseous waste at step 106, the fan is turned ON at step 108. If the fan is OFF at step 102, and if either or both the first sensor S1 is not detecting (i.e., S1=0) the presence of the gaseous waste, and the second sensor S2 is not detecting (i.e., S2=0) the presence of the gaseous waste at step 106, the fan remains OFF. In all cases, the control loop returns to step 102.

Figure 8:
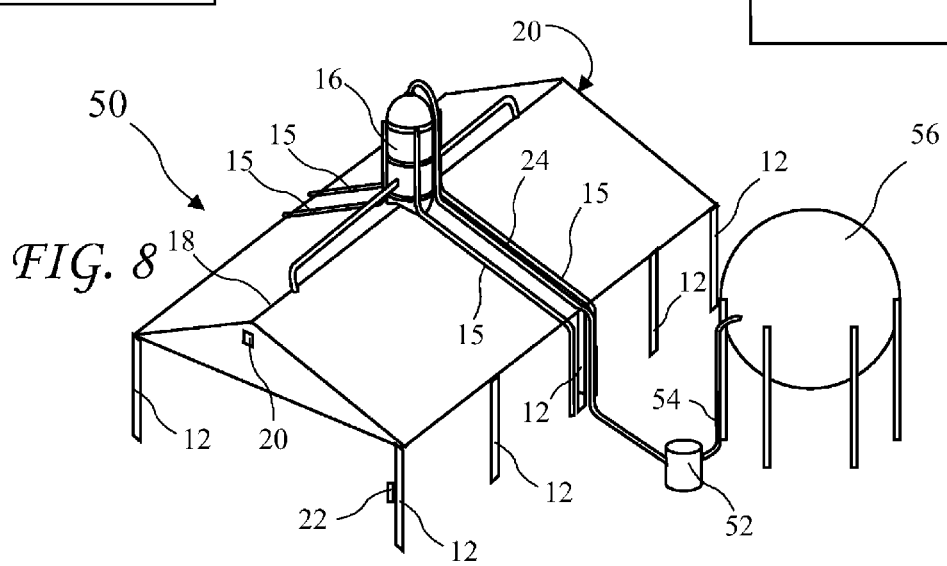
FIG. 8 depicts a small barn with the gas capture vessel residing at a peak, and gas containment equipment.

A small barn 50 with the gas capture vessel 16 residing at the peak 18, and gas containment equipment is shown in FIG. 8. The gas produced in the small barn 50 may not be sufficient to make the system shown in FIGS. 1 and 2 economically feasible. As a result, a small system comprising a fan 52 connected to the gas capture vessel 16 by the duct 24, and a gas storage tank 56 connected to the fan 52 by duct 54, is an alternative system. The gas stored in the tank 56 is periodically collected for processing at a remote location which services small livestock operations in the local area. Further, where a number of small livestock operations are near each other, pipes may connect each small livestock operation to a central processing station comprising the processing elements 26-44 described in FIGS. 1 and 2. The barn 50 is otherwise similar to the barn 10.

While the invention herein disclosed has been described by means of specific embodiments and applications thereof, numerous modifications and variations could be made thereto by those skilled in the art without departing from the scope of the invention set forth in the claims.

I claim:

1. A gas recovery system comprising:
   a barn;
   an upper tent portion of the barn forming an upward concave cavity;
   a gas capture vessel residing at a peak of the tent portion for collecting gaseous waste;
   the gas capture vessel is supported by external beams residing outside the barn; the gas capture vessel is external to the barn, and the gas capture vessel is grounded to serve as a lightning rod;
   a gas storage tank; and
   a fan for moving the gaseous waste from the capture vessel into the storage tank.

2. The gas recovery system of claim 1, wherein:
   the gas capture vessel comprises a non-electrically conductive cylindrical body and a conductive cap;
   the external beams are made of an electrically conductive material; and
   the conductive cap is electrically grounded through the external beans.

3. The gas recovery system of claim 2, wherein the cylindrical body is made from fiberglass.

4. The gas recovery system of claim 2, wherein the cap is made from steel.

5. The gas recovery system of claim 4, further including a lower metal band connected to the external beams and the cylindrical body for supporting the gas capture vessel.

6. The gas recovery system of claim 5, further including a center metal band connected to the external beams and the cylindrical body and wherein the lower metal band resides proximal to the base of the cylindrical body and the center metal band resides approximately centered between the cap and the lower metal band and the bands support the gas capture vessel.

7. The gas recovery system of claim 1, further including a first gas sensor residing in the gas capture vessel for sensing the presence of the gaseous waste in the gas capture vessel and electrically connected to a fan drawing gaseous waste from the capture vessel and turning the fan ON and OFF.

8. The gas recovery system of claim 7, further including a second gas sensor residing inside the gas capture vessel vertically spaced apart below the first gas sensor, wherein:
   the second gas sensor is for turning the fan ON when the second gas sensor senses the presence of gaseous waste; and
   the first gas sensor is for turning the fan OFF when the first gas sensor does not sense the presence of the gaseous waste.

9. The gas recovery system of claim 7, further including:
   an ammonia/methane separator receiving the gaseous waste from the gas capture vessel and separating ammonia from a flow of methane and other gasses; and
   a membrane unit for receiving the flow of methane and other gases and separating the methane from the other gasses, wherein the methane is stored in the gas storage tank.

10. The gas recovery system of claim 9, further including a power generator receiving the methane stored in the gas storage tank and converting the methane to electrical power.

11. The gas recovery system of claim 9, wherein the fan resides on an intake of the membrane unit and draws the gaseous waste from the gas capture vessel, and through the ammonia/methane separator.

12. The gas recovery system of claim 1, further including at least one ventilation assembly residing in the tent portion and controllable to release gaseous waste.

13. The gas recovery system of claim 1, further including air turbulence reduction shields comprising substantially flat sheets residing below the capture vessel.

14. The gas recovery system of claim 1, further including a lower post portion supporting the upper tent portion and comprising vertical posts and open between all the vertical posts.

15. A gas recovery system comprising:
   a barn comprising:
      a lower post portion comprising vertical posts and open between all the posts; and
      an upper tent portion forming an upward concave cavity;
   a gas capture vessel residing at a peak of the upper tent portion for collecting gaseous waste;
   external beams residing outside the barn and supporting the gas capture vessel independently of the barn;
   the gas capture vessel is external to the barn, and the gas capture vessel is grounded to serve as a lightning rod;
   a gas storage tank;
   a duct connected to the gas capture vessel for carrying the gaseous waste from the gas capture vessel toward the gas storage tank;
   a fan for moving the gaseous waste from the capture vessel toward the gas storage tank; and
   a gas sensor positioned to detect the presence of the gaseous waste in at least one of the group consisting of the peak of the tent portion, the capture vessel, and the duct.

* * * * *